(12) United States Patent
Porreca et al.

(10) Patent No.: US 8,640,352 B2
(45) Date of Patent: Feb. 4, 2014

(54) SUPERIOR MEASURING SYSTEM ACCURATE INTERIOR MEASURMENTS OF LARGE OR VERY SMALL ENCLOSURES

(76) Inventors: Fedele Anthony Porreca, Henderson, NV (US); Paul Vincent Porreca, Temecula, CA (US)

(*) Notice: Subject to any disclaimer, the term of this patent is extended or adjusted under 35 U.S.C. 154(b) by 202 days.

(21) Appl. No.: 13/356,645

(22) Filed: Jan. 23, 2012

(65) Prior Publication Data

US 2012/0186093 A1  Jul. 26, 2012

Related U.S. Application Data

(60) Provisional application No. 61/435,054, filed on Jan. 21, 2011.

(51) Int. Cl.
*B43L 7/10* (2006.01)

(52) U.S. Cl.
USPC ............... 33/464; 33/465; 33/783; 33/809

(58) Field of Classification Search
USPC ............... 33/464, 465, 755, 783, 787, 809
See application file for complete search history.

(56) References Cited

U.S. PATENT DOCUMENTS

| | | | | | |
|---|---|---|---|---|---|
| 1,718,003 | A | * | 6/1929 | Prsha | 33/755 |
| 2,270,227 | A | * | 1/1942 | Swanson et al. | 33/809 |
| 5,357,683 | A | * | 10/1994 | Trevino | 33/465 |
| 5,873,175 | A | * | 2/1999 | Johnston | 33/809 |
| 6,732,445 | B1 | * | 5/2004 | Scoville | 33/809 |
| 6,769,192 | B2 | * | 8/2004 | Johansson et al. | 33/809 |
| 7,228,644 | B1 | * | 6/2007 | Hellem et al. | 33/465 |
| 7,497,022 | B1 | * | 3/2009 | Aarhus | 33/809 |
| 2002/0170189 | A1 | * | 11/2002 | Cheatham | 33/464 |

* cited by examiner

*Primary Examiner* — G. Bradley Bennett
(74) *Attorney, Agent, or Firm* — Sinorica, LLC

(57) ABSTRACT

A superior measuring system comprises three sidewinders and a cobra measure which allows the users to take inside measurement with the assistance for one else. Sidewinders are use to measure distance between 2' to 23' and comprise a casing, an upper blade, and a bottom blade. The cobra measure comprises a main body, a single blade and a hood. The sidewinders have three extending blades which extend from the front and the back sides. The both blades can be locked from a locking mechanism so the blades do not move freely. The cobra measure comprises an angle control which control the angle that the single blade so accurate measurements. The single blade in the cobra measure is a curved shaped blade which provides better stability when measurements are taken.

18 Claims, 7 Drawing Sheets

SUPERIOR MEASURING SYSTEM ACCURATE INTERIOR MEASURMENTS OF LARGE OR VERY SMALL ENCLOSURES

The current application claims a priority to the U.S. Provisional Patent application Ser. No. 61/435,054 filed on Jan. 21, 2011.

FIELD OF THE INVENTION

The present disclosure generally relates to apparatuses and methods for accurately measuring the distance between objects as far apart as (but not limited to) twenty three feet horizontally or vertically or the interior of enclosures as narrow as one inch with the ability to take the measurement not only at the entrance but also inside an enclosure whose entrance is narrower than the interior.

BACKGROUND OF THE INVENTION

Various types of tools are presently in use which measure distance, with most of them satisfactorily performing a specific task. Rulers are rigid and are useful as a straight edge for drawing straight lines but cannot be shortened or expanded. Tape measures are flexible so the tape can be "hooked" at one end of the work and pulled tightly to achieve the accuracy over a short or long distance. Tape measures are mainly used in taking outside measurements.

Problems with tape measures arise when attempting an inside measure. The hook must be held firmly against one side of the enclosure while the case is moved to the other side. This requires pushing the hook against the side, which usually results in the collapse of the blade. Even if the blade doesn't collapse, it will probably sag, thereby distorting the measurement. Add to this the possibility that the case (which is part of the measurement) is not precise, or the hook sometimes being bent, or the blade collapsing when measuring vertically (as in a floor to ceiling measurement), then it is simple to see that the tape measure, although valuable for taking outside measurements, fails to perform when measuring inside places like cabinets, doors, windows, floor to ceiling etc. Also, a long inside measurement often requires assistance.

Therefore, in order to insure an accurate inside measurement, what is needed is a blade that does not collapse when it is pressed firmly against a wall or some other object and does not sag causing a distorted measurement when extended over long distances.

Some of the measuring tools exist partially solve the above problem. They are called "measuring sticks", or the longer and heavier version called "measuring poles". These are generally square or round telescopic tubes of variable sizes and weight with "measure" markings on them. They consist of a case which holds a telescopic extension piece (or pieces) shorter than the case with each successive piece being a few inches shorter than the previous. Neither of these tools or even a caliper is able to measure deep inside an enclosure or inside measures which are narrower than the length of the measuring tool's case.

Also, it is obvious that when such an assembly is telescopically extended horizontally, its own weight will cause the telescopic tubes to sag and. If the members of the assembly are not tight within each other, the telescopic parts will sag even more. The solution therefore is to not only make the extension piece or pieces as lightweight as possible but also have as few members as possible.

DETAIL DESCRIPTIONS OF THE INVENTION

Figure 1:
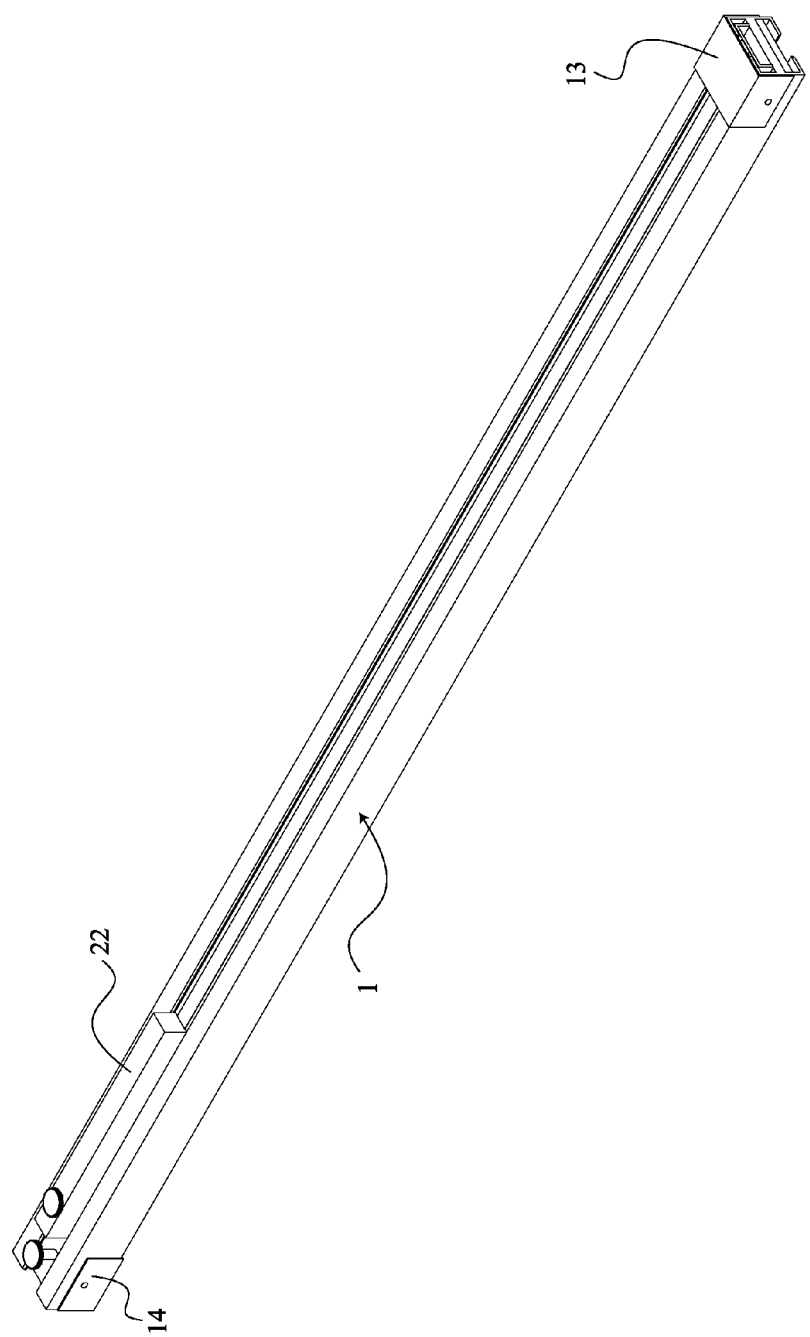
FIG. 1 is a perspective view of the sidewinder embodiment illustrating the upper blade and the bottom blade being housed within the casing.
Figure 2:
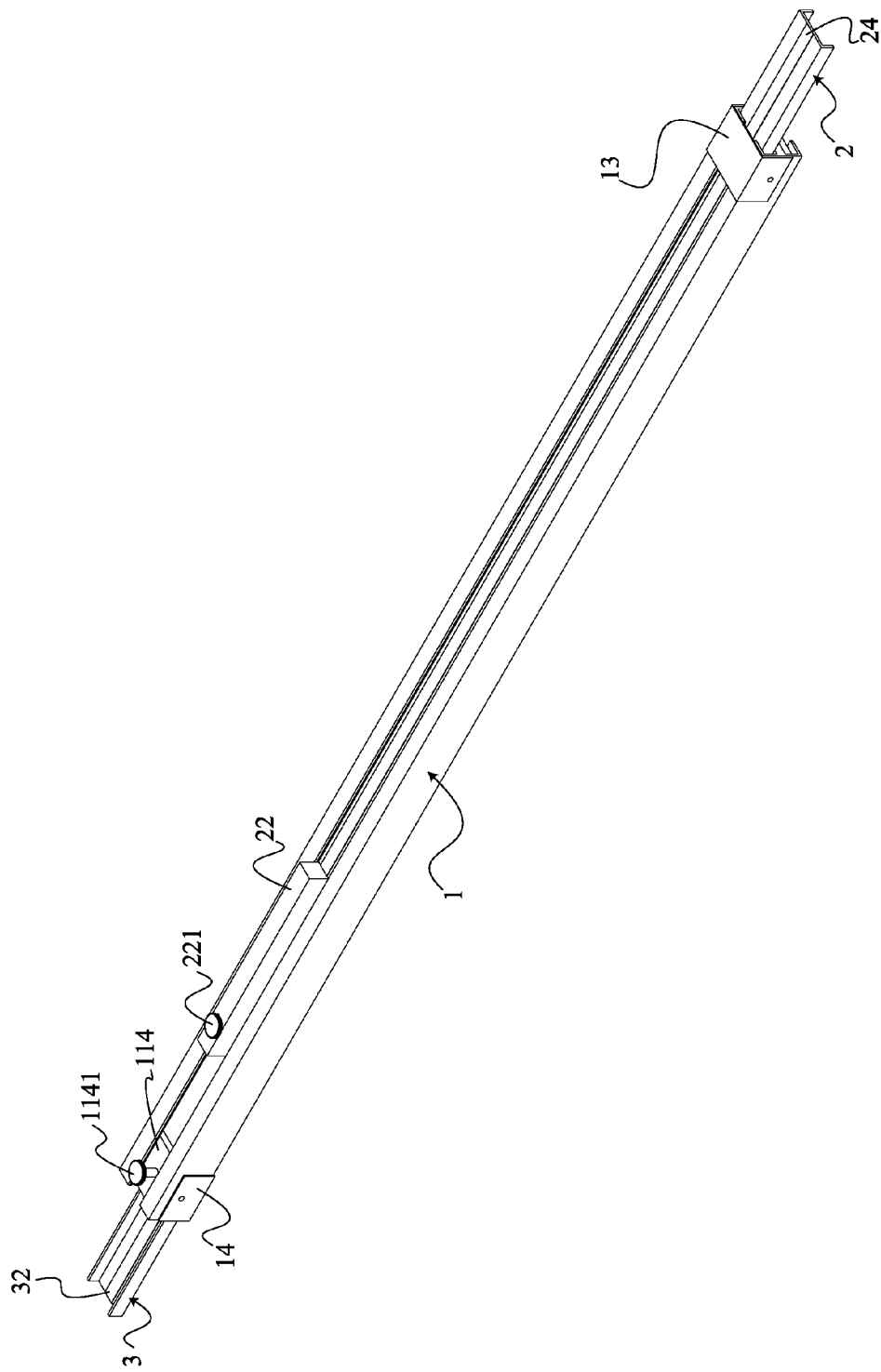
FIG. 2 is a perspective view of the sidewinder embodiment illustrating the upper blade and the bottom blade being extended from the casing.
Figure 3:
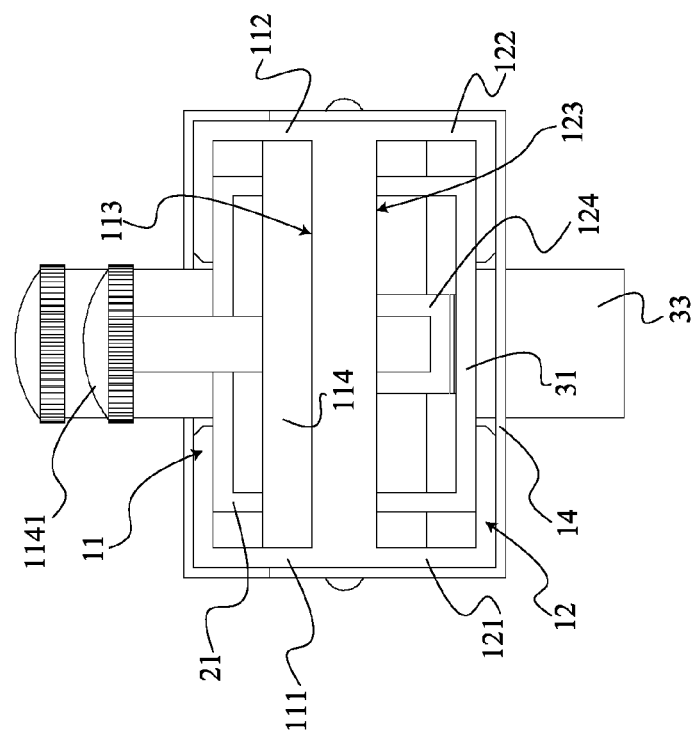
FIG. 3 is a back view of the sidewinder embodiment.
Figure 4:
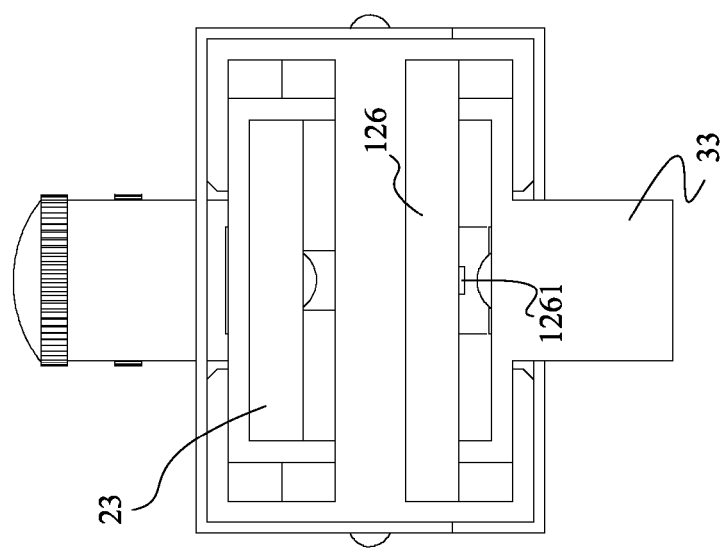
FIG. 4 is a front view of the sidewinder embodiment.
Figure 5:
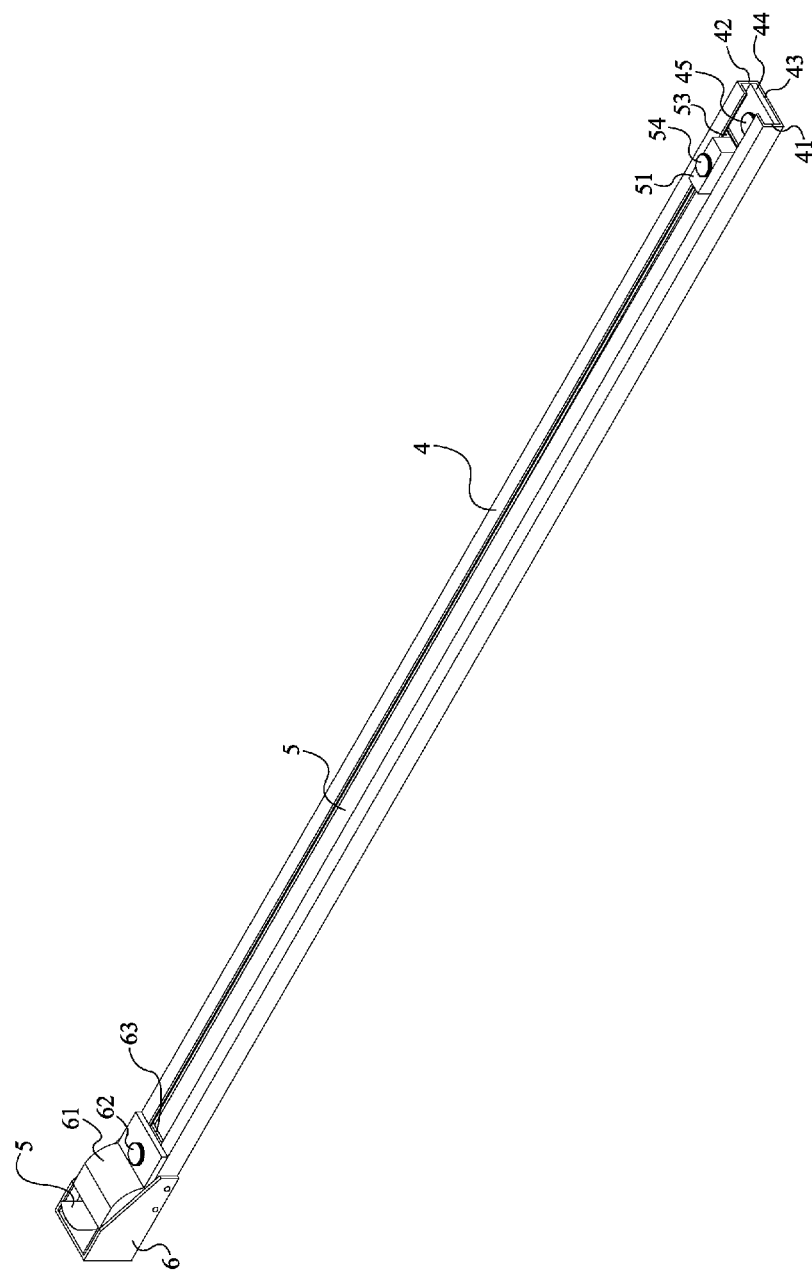
FIG. 5 is a perspective view of the cobra embodiment illustrating the single blade being housed within the main body.
Figure 6:
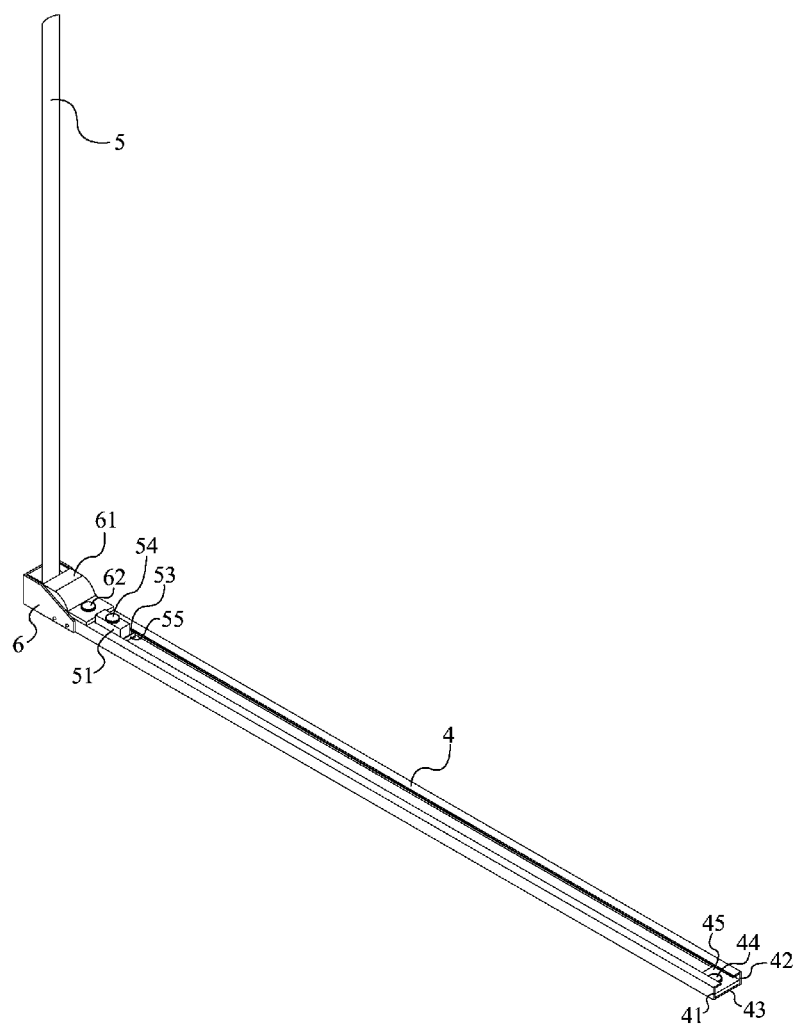
FIG. 6 is a perspective view of the cobra embodiment illustrating the single blade being perpendicularly extended from the main body.
Figure 7:
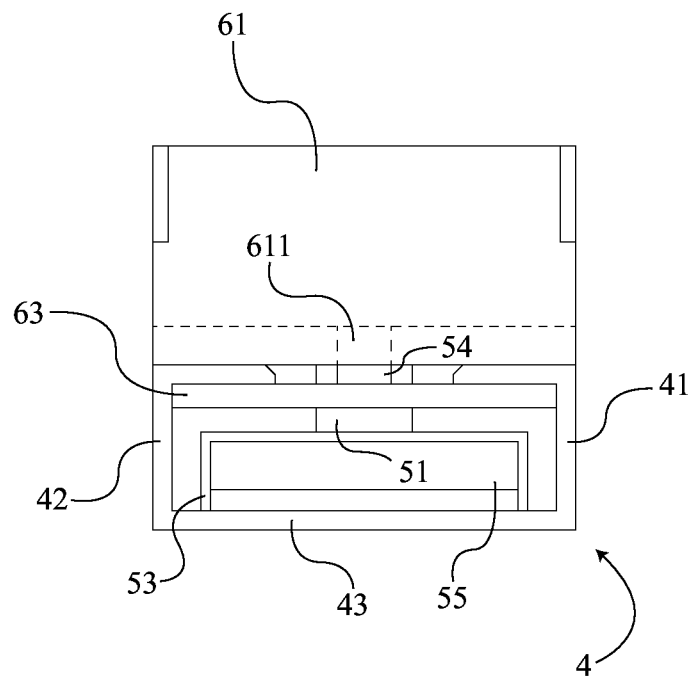
FIG. 7 is a back view of the cobra embodiment without the hood and the single blade.

All illustrations of the drawings are for the purpose of describing selected versions of the present invention and are not intended to limit the scope of the present invention.

The present disclosure, SUPERIOR MEASURING SYSTEM, is generally directed to a system of four measuring tools which are able to accurately take inside measurements from one inch to twenty three feet. The ability for one person to take such long, accurate measurements is due to the proprietary ultra-light weight but strong extension blades or blade which telescope from the main body. Because of the new method of construction which stiffens and strengthens the blades, sagging and collapse of the blades are eliminated, which results in a feeling of certainty that the measurement was accurately taken. First, second, and third measuring tools are called sidewinders and the fourth tool is identified as cobra measure. The sidewinders have two telescopic blades but the telescopic blades never exit the stick measures completely. The three sidewinders require five inch to remain to counteract the leverage of the telescopic blade's weight. The cobra measure only comprises one telescopic blade.

Sidewinders

Sidewinders measures from 2' to 23'. The first sidewinder measures from 2' to 5', the second sidewinder measures from 5' to 14' and third sidewinder measures from 14' to 23'. All three sidewinders have the same components and configurations. Each sidewinder comprises a casing 1, an upper blade 2, and a bottom blade 3.

The casing 1 comprises a first channel 11, a second channel bottom 12, a front bridge 13, a rear bridge 14, and a screw hole 15. The first channel 11 comprises a first left railing 111, a first right railing 112, a first channel bottom 113 and a first nut 114. The first nut 114 comprises a first locking screw 1141. The second channel 12 comprises a second left railing 121, a second right railing 122, a second channel bottom 123, a locking strip 124, and a second nut 126. The second nut 126 comprises a connecting screw 1261. The first channel 11 and the second channel 12 have a "U" shape design. The first left railing 111, the first right railing 112, the second left railing 121, and the second right railing 122 are beveled. Both channels are made out of strong light weight materials like aluminum which can endure constant moving pieces. The thickness of the first left railing 111, the first right railing 112, the second left railing 121, and the second right railing 122 is 0.050". The thickness between the first channel bottom 113 bottom 113 and the second channel bottom 123 is 0.163". The outside width of the first channel bottom 113 and the second channel bottom 123 is 1.080" and the inside width of the first channel bottom 113 and the second channel bottom 123 is 0.980". The total height of the present invention is 0.763" and the inside height of the each channel is 0.25". The first nut 114 is positioned at the back end of the first channel bottom 113. Height of the first nut 114 is ¼" and width is 0.960". The length of the first nut 114 is 1". The first nut 114 centrally comprises 8-32 female threaded hole which has a diameter of 0.140". The first locking screw 1141 is inserted into the female threaded hole and screwed down through the screw hole 15. The first locking screw 1141 is a ⅜" long socket head screw with male threads. The screw hole 15 is positioned in the back end of the first channel bottom 113 and second channel bottom 123 and the diameter of the screw hole 15 is 0.180". The second nut is positioned at the front end of the second channel bottom 123. Height of the second nut is ¼" and width is 0.960". The length of the second nut is 1". The second nut centrally comprises 8-32 female threaded hole which has a diameter of 0.140". The connecting screw 1261 is inserted into the female threaded hole and screwed down. The connecting screw 1261 is a ⅜" long socket head screw with male threads. The second nut is positioned inside the second channel bottom 123 so the bottom blade 3 does not exit from the front of the casing. The locking strip 124 has a length of 5" and a thickness of 0.005". 2" of the locking strip 124 is connected to the second channel bottom 123 bottom from its left end. The locking strip 124 is made out of spring steel in order to provide the necessary flexibility. The first locking screw 1141 has the ability to lock the extending bottom blade 3 at any location. When the first locking screw 1141 is tighten down, bottom of the first locking screw 1141 hits the locking strip 124. Then the locking strip 124 bends downward and contacts with the bottom blade 3, locking the bottom blade 3. The locking strip 124 is put in place so the printed numbers of the bottom blade 3 don't get scratched when the locking screw is screwed downward.

The front bridge 13 is positioned at the front end of the casing 1. The front bridge 13 is connected flushed with the first channel 11 and 3/32" rivets are used to attach the two components. The rear bridge 14 is positioned to the casing 1 from the back end. The rear bridge 14 is connected flushed with the second channel 12 and 3/32" rivets are used to attach the two components together. Both front bridge 13 and the rear bridge 14 have the same thickness which is 1/16" and have a "U" shape design. The "U" shape comprises two vertical arms and a horizontal section. The height of the two vertical arms is 0.648" and the width of the horizontal section is 1.205". the length of the bridge is 1".

The upper blade 2 comprises an upper channel 21, a push bar 22, a nut 23, and a first blade 24. The push bar 22 comprises a push bar screw 221. The upper blade 2 is positioned inside the first channel 11. The upper channel 21, which comprises a "U" shape design, is positioned inside the first channel 11 upside down. The arms of the upper channel 21 are positioned with the first channel bottom 113. The upper channel 21 has a 1/16" thickness, a 0.225" height and a ¾" inside width. The length of the upper channel 21 is always 1" shorter than the casing 1 length. The push bar 22 is positioned between the first left railing 111 and the first right railing 112. The push bar 22 is connected to the upper channel 21 from the top side which is the horizontal section of the "U" shape design. The upper channel 21 is made out of aluminum to minimize the weight of the present invention. Back end of the upper channel 21 has three holes. The three holes are centrally created through the upper channel 21. Top and bottom holes in the upper channel 21 are created from a #30 drill bit and the diameter of the holes is 0.128". Middle hole in the upper channel 21 is created by a #15 drill bit and the diameter of the hole is 0.180". The length of the push bar 22 is 4" in all three sizes of the sidewinders has same height and width which is 7/16". The bottom side of the push bar 22 comprises three holes. The three holes are centrally created in the push bar 22. Top and bottom holes in the push bar 22 are created from a #30 drill bit and the diameter of the holes is 0.128". Middle hole in the push bar 22 is created by a #15 drill bit and the diameter of the hole is 0.180". The middle hole in the push bar 22 is created through the push bar 22. The push bar 22 is made out of plastic or materials similar to plastic so the weight of the component is minimized. The nut 23 is positioned inside the upper channel 21. Thickness of the nut 23 is ⅛" and the length and width of the nut 23 is 1" and ¾" respectively. The bottom side of the nut 23 comprises three holes. All three holes are centrally created through the nut 23 along its length. Top and bottom holes in the nut 23 are created from a #30 drill bit and the diameter of the holes is 0.128". Middle hole in the nut 23 is created by a #28 drill bit and the diameter of the hole is 0.140". The middle hole in the nut 23 comprises 8-32 thread. The nut 23 is made out of light weighted materials like plastic or aluminum. All of the top and bottom holes in the push bar 22, upper channel 21, and the nut 23 are aligned and two rivets are drilled from the bottom side of the nut 23 connecting three components. The push bar screw 221 is inserted through the push bar 22 and the upper channel 21 and connected with the 8-32 thread in the nut 23. The push bar screw 221 can be screwed down to lock the upper blade 2 at any desirable location. The push bar screw 221 contacts with the first channel bottom 113 and prevent the upper blade 2 from moving. The first blade 24 is positioned on the horizontal section of the upper channel 21 and the thickness and the width of the first blade 24 are 0.005" and ¼" respectively. The first blade 24 is made out of spring steel and all of the measuring numbers are visible to the users between the first left railing 111 and the first right railing 112. The push bar also 22 stops the complete exiting of the upper blade 2 from the casing upon the contacts with the front bridge 13.

The bottom blade 3 comprises a bottom channel 31, a second blade 32, and a bottom moving bar 33. The bottom blade 3 is positioned inside the second channel 12. The bottom channel 31, which comprises a "U" shape design, is positioned inside the second channel 12 upside down. The second channel can be also connected to the bottom blade parallel to the bottom channel 31. The arms of the bottom channel 31 are positioned with the second channel bottom 123 bottom. The bottom channel 31 has a 1/16" thickness, a 0.225" height and a ¾" inside width. The length of the bottom channel 31 is always 1" shorter than the casing 1 length. The bottom channel 31 is made out of aluminum to minimize the weight of the present invention. The second blade 32 is positioned inside of the horizontal section of the bottom channel 31 and the thickness and the width of the second blade 32 are 0.005" and ¼" respectively. When the bottom channel 31 exits from the casing 1, the inside of the bottom channel 31 is faced toward the user. The second blade 32 is made out of spring steel. The bottom moving bar 33 is connected to the bottom blade 3 from the front end. The length of the bottom moving bar 33 is 4" in all three sizes sidewinders.

In the first sidewinder, the length of the casing is 24". The upper blade 2 only exits 18" and the bottom blade 3 only exits 18" also. 5" of the upper blade 2 and the bottom blade 3 remains inside the casing. 4" of the remaining 5" is occupied by the push bar 22 and the bottom moving bar 33 in the upper blade 2 and the bottom blade 3 respectively. Last one 1" of the remaining 5" is covered by the front bridge 13. The upper blade 2 has the 24$^{th}$ inch as the starting point and ends at 43$^{rd}$ inch. Only the 42$^{nd}$ inch is visible because the 43$^{rd}$ inch is positioned under the front bridge 13. The bottom blade 3 has the 42$^{nd}$ inch as the starting point and ends at the 61$^{st}$ inch. Only the 60$^{th}$ inch is visible because the 61$^{st}$ inch is positioned inside the rear bridge 14. Therefore, in the first sidewinder, 2' casing expands up to 5'.

In the second sidewinder, the length of the casing is 60". The upper blade 2 only exits 54" and the bottom blade 3 only exits 54" also. 5" of the upper blade 2 and the bottom blade 3 remains inside the casing. 4" of the remaining 5" is occupied by the push bar 22 and the bottom moving bar 33 in the upper blade 2 and the bottom blade 3 respectively. Last one 1" of the remaining 5" is covered by the front bridge 13. The upper blade 2 has the 60$^{th}$ inch as the starting point and ends at 115$^{th}$ inch. Only the 114$^{th}$ inch is visible because the 115$^{th}$ inch is positioned under the front bridge 13. The bottom blade 3 has the 114$^{th}$ inch as the starting point and ends at the 169$^{th}$ inch. Only the 168$^{th}$ inch is visible because the 169$^{th}$ inch is positioned inside the rear bridge 14. Therefore, in the second sidewinder, 5' casing expands up to 14'.

In the third sidewinder, the length of the casing is 96". The upper blade 2 only exits 90" and the bottom blade 3 only exits 90" also. 5" of the upper blade 2 and the bottom blade 3 remains inside the casing. 4" of the remaining 5" is occupied by the push bar 22 and the bottom moving bar 33 in the upper blade 2 and the bottom blade 3 respectively. Last one 1" of the remaining 5" is covered by the front bridge 13. The upper blade 2 has the 96$^{th}$ inch as the starting point and ends at 187$^{th}$ inch. Only the 186$^{th}$ inch is visible because the 187$^{th}$ inch is positioned under the front bridge 13. The bottom blade 3 has the 186$^{th}$ inch as the starting point and ends at the 277$^{th}$ inch. Only the 276$^{th}$ inch is visible because the 277$^{th}$ inch is positioned inside the rear bridge 14. Therefore, in the second sidewinder, 8' casing expands up to 23'.

For an example, to measure the distance between two walls or objects sighted to be between 24" and 60" apart, the first sidewinder is placed firmly against a surface or wall. Then the upper blade 2 is extended toward the left wall until the upper blade 2 touches the left wall. The distance can be read at the point where the upper blade 2 exits the casing 1. If the distance is larger than 42" the upper blade 2 can be locked with the push bar screw 221. Then the upper blade 2, being as strong as it is, can be firmly pressed against the surface or the wall and the bottom blade 3 is extended from the right side of the casing 1. The bottom blade 3 starts with the 42" and progress up to 60" (5'). If the distance is less than 60", the bottom blade 3 can be locked by the first locking screw 1141.

Cobra measure

The cobra measure, which is the second embodiment has the similar concept the first three sidewinders but comprises only one extending blade and a completely different proprietary method of performance and a different components configuration. The second embodiment enables the tool to take any measurements under 24" but not limited to 24". The second embodiment can determine inside measurements as small as one inch and is designed to fit into deep and narrow places. The second embodiment comprises a main body 4, a single blade 5, and a hood 6. The main body 4 comprises a left channel 41, a right channel 42, a channel bottom 43, a blocking nut 44, and a blocking nut screw 45. The main body 4 has a "U" shape design and made out from aluminum. The left channel 41 and the right channel 42 have a thickness of 0.050" and the space between the right channel 42 and the left channel 41 is 0.464" at the top side. The channel bottom 43 has the thickness of 0.113" and the outside width of the main body 4 is 1.080". The inside width of the main body 4 is 0.980" and the inside height of the main body 4 is ¼". The length of the main body 4 is 26 3/16". The blocking nut 44 is positioned at the back end of the main body 4. Height of the blocking nut 44 is ¼" and width is 0.960". The length of the blocking nut 44 is 1". The blocking nut 44 centrally comprises 8-32 female threaded hole which has a diameter of 0.140". The connecting screw 1261 is inserted into the female threaded hole and screwed down. The blocking nut screw 45 is a ⅜" long socket head screw with male threads. The blocking nut 44 is positioned inside the main body 4 so the single blade 5 does not exit from the back of the main body 4.

The traditional blades of the tape measures have a curved shaped blade and the present invention also has a curved shaped blade. The thickness of the single blade 5 is 0.005" and the length is 26.5". The width of the single blade 5 is 0.980" and the chord length is 0.900". The curved shape arc is taken from a circle having a radius of 0.6525". Because of the concave shape, the single blade 5 extends without collapsing. The single blade 5 has numbers printed on the surface and the single blade 5 functions like a normal blade. The single blade 5 comprises a blade control bar 51, a blade channel 53, a blade screw 54, and a blade nut 55. The blade control bar 51 controls the blade movement with an easy push and pull method. The length of the blade control bar 51 is 1" in the second embodiment and has same height and width which is 7/16". The bottom side of the blade control bar 51 comprises three holes. The three holes are centrally created in the blade control bar 51 along the 1" length. Top and bottom holes in the blade control bar 51 are created from a #30 drill bit and the diameter of the holes is 0.128". Middle hole in the blade control bar 51 is created by a #15 drill bit and the diameter of the hole is 0.180". The middle hole in the blade control bar 51 is created through the blade control bar 51. The blade control bar 51 is made out of plastic or materials similar to plastic so the weight of the component is minimized. The blade channel 53 is made out of aluminum to minimize the weight of the present invention and the blade channel 53 has three holes. The three holes are centrally created through the blade channel 53 along its length. Top and bottom holes in the blade channel 53 are created from a #30 drill bit and the diameter of the holes is 0.128". Middle hole in the blade channel 53 is created by a #15 drill bit and the diameter of the hole is 0.180". The blade nut 55 is positioned inside the blade channel 53. Thickness of the blade nut 55 is ⅛" and the length and width of the nut is 1" and ¾" respectively. The bottom side of the blade nut 55 comprises three holes. All three holes are centrally created through the blade nut 55 along its length. Top and bottom holes in the blade nut 55 are created from a #30 drill bit and the diameter of the holes is 0.128". Middle hole in the blade nut 55 is created by a #28 drill bit and the diameter of the hole is 0.140". The middle hole in the blade nut 55 comprises 8-32 thread. The blade nut 55 is made out of light weighted materials like plastic or aluminum. The end of the single blade 5 comprises three holes. Top and bottom holes in the single blade 5 are created from a #30 drill bit and the diameter of the holes is 0.128". Middle hole in the single blade 5 is created by a #15 drill bit and the diameter of the hole is 0.180". All of the top and bottom holes in the single blade 5, the blade nut 55, the blade channel 53, and the blade control bar 51 are aligned from bottom to top respectively and two rivets are drilled from the bottom side of the single blade 5 connecting the four components. The blade screw 54 is inserted through the blade control bar 51, the single blade 5, and the blade channel 53 and connected with the blade nut 55. The blade screw 54 can be screwed down to lock the single blade 5 at any desirable location. The blade screw 54 contacts with the channel bottom 43 and prevent the single blade 5 from moving.

The hood 6 comprises an angle control 61, an angle control screw 62, and an angle control nut 63. The hood 6 is a component which is joined to the outside of the main body 4 from the front side. Plurality of rivets from the each side of the hood 6 connects the hood 6 to the main body 4. The plurality of rivets is flat headed with 3/32" diameter and 1/4" long. The hood 6 is made from 1/16" thick aluminum plate. A 3/4 " space is occupied between front outside wall of the main body 4 and inside wall of the hood 6. The hood 6 has a "U" shape design from the top view and both sides have a length of 2". The outside distance between the two sides is 1.205" and the inside distance between the two sides is 1.080". Top end of the each side has a 0.425" height and bottom end of the each side has a 1" height. The top end of the hood 6 is connected to the main body 4. The new total length of the main body 4 including the hood 6 is 27". Each side of the hood 6 comprises a blade sag control components. Each blade sag control component has the dimension of 0.40"×1/4"×1/2". Each blade sag control component is connected form the inside of the hood 6. Because of the blade sag control components the inside space between the walls of the hood 6 is reduced by 0.080".

The angle control 61 is attached to the main body 4 from outside with a precise 90 degree angle to the main body 4. The angle control 61 changes angle of the single blade 5 according to the amount of pressure the angle control 61 applies against the single blade 5. The single blade 5 exits the hood 6 at precisely 90 degrees to the main body 4 because of the angle control 61. The angle control 61 is made out of opaque polycarbonate. The opaque polycarbonate was chosen because it is durable, slippery, and won't scratch the single blade 5, even though the single blade 5 travels many times and constantly rubs against the opaque polycarbonate. The angle control 61 has a length of 1.750" and a height of 1". The shape of the angle control 61 is somewhat similar to an "L" shape. The vertical section of the angle control 61 is positioned on top of the main body 4 and comprises a 0.150" diameter angle control hole 611. The angle control hole 611 is positioned centrally to the angle control 61 and center of the angle control hole 611 is 0.470" from the right end of the angle control 61. The angle control hole 611 comprises female 8-32 threads. The angle control screw 62, a socket head screw with male 8-32 thread, is inserted through the angle control hole 611. The angle control nut 63 is positioned under the left channel 41 and right channel 42. The female threads of the angle control nut 63 are connected with the male threads of the angle control screw 62. After the angle control 61 is position at the correct position in the main body 4, the angle nut can be tied to the main body 4 by screwing the angle control screw 62 down.

The cobra measure can be used to take either vertical measures or horizontal measures. In either case, the hood 6 which is precisely one inch tall is always a part of the measurement. Because of this, the single blade 5 does not exit at zero. The first number on the single blade 5 is inch #1. Therefore, when the single blade 5 is fully retracted; the number which is at rest at the hood 6 is #1. The total length of the single blade 5 is 26½". 23" are used on the single blade 5 for measuring with 2½" occupied by the hood 6 and 1" is occupied by the blade control bar 51. The uniqueness of the cobra measure is that it can be inserted into a space to be measured, as though the tool was pointing at the space instead of assuming the usual lateral position. For this reason, it is able to measure spaces as small as one inch. Once it has entered the space, it can rise 90 degrees from its recoiled position; hence the name "cobra".

Although the invention has been explained in relation to its preferred embodiment, it is to be understood that many other possible modifications and variations can be made without departing from the spirit and scope of the invention as hereinafter claimed.

What is claimed is:

1. A sidewinder measure comprises,
a casing;
a upper blade;
a bottom blade;
the casing comprises a first channel, a second channel, a front bridge, a rear bridge, and a screw hole;
the upper blade comprises a upper channel, a push bar, a nut, and a first blade; and
the bottom blade comprises a bottom channel, a second blade, and a bottom moving bar.

2. The sidewinder as claimed in claim 1 comprises,
the first channel being connected to the second channel from above;
the front bridge being positioned on top of the first channel;
the front bridge being connected to the first channel from front end;
the rear bridge being positioned below the second channel;
the rear bridge being connected to the second channel from back end;
the screw hole being jointly positioned in the first channel and the second channel;
the screw hole being positioned above the rear bridge;
the upper blade being positioned inside the first channel; and
the bottom blade being positioned inside the second channel.

3. The sidewinder as claimed in claim 2 comprises,
the first channel comprises a first left railing, a first right railing, a first channel bottom, and a first nut;
the first left railing being perpendicularly connected to the first channel bottom from an end;
the first right railing being perpendicularly connected to the first channel bottom opposite from the first left railing;
the first nut being positioned inside the first channel; and
the first nut being placed on top of the screw hole.

4. The sidewinder as claimed in claim 3 comprises,
the diameter of the screw hole being larger than the diameter of the first nut;
the first nut comprises a first locking screw;
the first locking screw being concentrically threaded into the first nut; and
the first locking screw being exited through the screw hole.

5. The sidewinder as claimed in claim 2 comprises,
the second channel comprises a second left railing, a second right railing, a second channel bottom, a locking strip, and a second nut;
the second left railing being perpendicularly connected to the second channel bottom from an end;
the second right railing being perpendicularly connected to the second channel bottom opposite from the second left railing;
the locking strip being connected to the second channel bottom from the back end; and
the second nut being positioned inside the second channel under the front bridge.

6. The sidewinder as claimed in claim 5 comprises,
the second nut comprises a connecting screw; and
the connecting screw being concentrically threaded into the second nut.

7. The sidewinder as claimed in claim 2 comprises,
the upper channel being positioned inside the upper blade;
the nut being positioned inside the upper channel;

the first blade being connected to the upper channel;
the push bar being connected to the upper channel;
the push bar comprises a push bar screw;
the push bar screw being inserted through the push bar and the upper channel; and
the push bar screw being threaded into the nut.

8. The sidewinder as claimed in claim 2 comprises,
the bottom channel being positioned inside the bottom blade;
the bottom moving bar being connected to the bottom channel; and
the second blade being connected to the bottom channel.

9. A cobra measure comprises,
a main body;
a single blade;
a hood;
the main body comprises a left channel, a right channel, a channel bottom, a blocking nut, and a blocking nut screw;
the single blade comprises a blade control bar, a blade channel, a blade screw, and a blade nut; and
the hood comprises an angle control, an angle control screw, and an angle control nut.

10. The cobra as claimed in claim 9 comprises,
the single blade being positioned inside the main body;
the hood being connected to the main body from an end; and
the angle control being positioned inside the hood parallel to the main body.

11. The cobra as claimed in claim 10 comprises,
the left channel being perpendicularly connected to the channel bottom;
the right channel being perpendicularly connected to the channel bottom opposite from the left channel;
the blocking nut being positioned inside the casing; and
the blocking nut screw being threaded into the blocking nut.

12. The cobra as claimed in claim 10 comprises,
the blade control bar being positioned on top of the blade channel;
the blade nut being positioned inside the blade channel and under the blade control bar;
the single blade being positioned under the blade nut;
the blade control bar, the blade channel, the blade nut and the single blade being connected together;
the blade screw being perpendicularly inserted into the blade control bar and the blade channel; and
the blade screw being threaded into the blade nut.

13. The cobra as claimed in claim 10 comprises,
the angle control comprises an angle control hole;
the angle control being positioned on top of the left channel and the right channel;
the angle control nut being positioned under the left channel and the right channel; and
the angle control screw being inserted through the angle control hole and threaded into the angle control nut.

14. A sidewinder measure comprises,
a casing;
a upper blade;
a bottom blade;
the casing comprises a first channel, a second channel, a front bridge, a rear bridge, and a screw hole;
the upper blade comprises a upper channel, a push bar, a nut, and a first blade;
the bottom blade comprises a bottom channel, a second blade, and a bottom moving bar;
the first channel being connected to the second channel from above;
the front bridge being positioned on top of the first channel;
the front bridge being connected to the first channel from front end;
the rear bridge being positioned below the second channel;
the rear bridge being connected to the second channel from back end;
the screw hole being jointly positioned in the first channel and the second channel;
the screw hole being positioned above the rear bridge;
the upper blade being positioned inside the first channel; and
the bottom blade being positioned inside the second channel.

15. The sidewinder as claimed in claim 14 comprises,
the first channel comprises a first left railing, a first right railing, a first channel bottom, and a first nut;
the first left railing being perpendicularly connected to the first channel bottom from an end;
the first right railing being perpendicularly connected to the first channel bottom opposite from the first left railing;
the first nut being positioned inside the first channel;
the first nut being placed on top of the screw hole;
the diameter of the screw hole being larger than the diameter of the first nut;
the first nut comprises a first locking screw;
the first locking screw being concentrically threaded into the first nut; and
the first locking screw being exited through the screw hole.

16. The sidewinder as claimed in claim 14 comprises,
the second channel comprises a second left railing, a second right railing, a second channel bottom, a locking strip, and a second nut;
the second left railing being perpendicularly connected to the second channel bottom from an end;
the second right railing being perpendicularly connected to the second channel bottom opposite from the second left railing;
the locking strip being connected to the second channel bottom from the back end;
the second nut being positioned inside the second channel under the front bridge;
the second nut comprises a connecting screw; and
the connecting screw being concentrically threaded into the second nut.

17. The sidewinder as claimed in claim 14 comprises,
the upper channel being positioned inside the upper blade;
the nut being positioned inside the upper channel;
the first blade being connected to the upper channel;
the push bar being connected to the upper channel;
the push bar comprises a push bar screw;
the push bar screw being inserted through the push bar and the upper channel; and
the push bar screw being threaded into the nut.

18. The sidewinder as claimed in claim 14 comprises,
the bottom channel being positioned inside the bottom blade;
the bottom moving bar being connected to the bottom channel; and
the second blade being connected to the bottom channel.

* * * * *